United States Patent Office 3,124,189
Patented Mar. 10, 1964

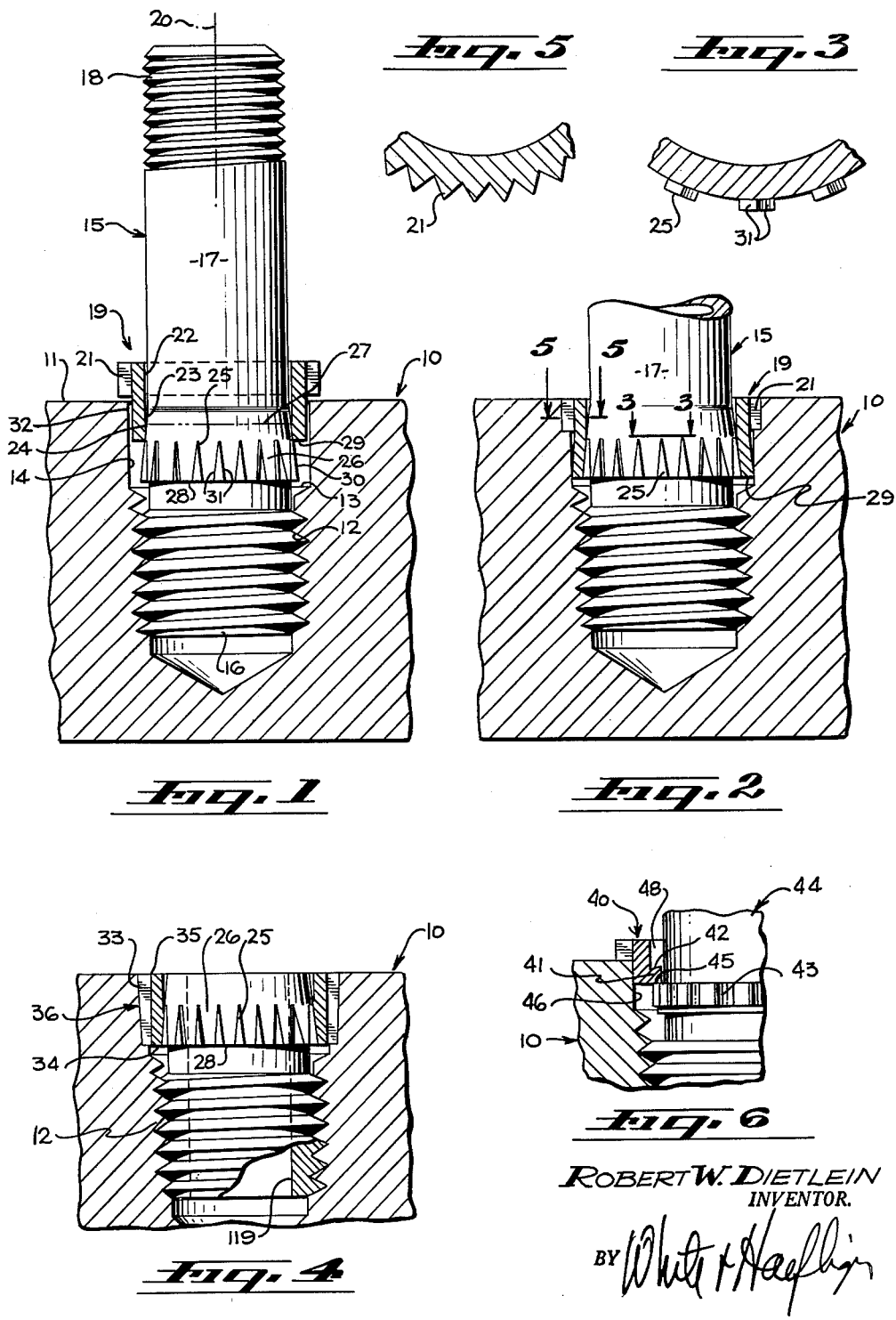

3,124,189
RING-LOCKED FASTENER
Robert W. Dietlein, La Crescenta, Calif., assignor to Components Engineering and Manufacturing Company, Inc., Los Angeles, Calif., a corporation of California
Filed Nov. 1, 1960, Ser. No. 66,508
1 Claim. (Cl. 151—41.73)

This invention relates generally to fastener structures and more specifically concerns improvements in so-called ring-locked fasteners.

The improvements with which the invention is particularly concerned are incorporated in that type of fastener which is attachable to a base such as a panel, the fastener including a longitudinally forwardly extending shank member connectible into a recess formed in the base, and a ring member received on the shank member and connectible into the base during relative forward advancement of the ring member along the shank and into the recess, to secure the ring against rotation relative to the base. Typical known fasteners of this general type are shown in U.S. Patent 2,400,318 issued to Joseph Rosan.

The present invention improves substantially the construction and function of the Rosan type fastener in certain respects which will be brought out in detail herein. Some of the difficulties associated with Rosan type fasteners and overcome by the present invention include the limited number of rotary positions in which the ring member may be advanced forwardly into locking engagement with the shank member, and also the lack of a tight gripping interfit between the ring member and the shank member These limitations flow from the use in the Rosan type fastener of interfitting serrations on the ring and shank members, these serrations furthermore contributing to the characteristically relatively large outer diameter of the ring member in relation to the crest diameter of the external thread on the shank member which holds the latter in the internally threaded recess of the base member.

Toward overcoming the above mentioned disadvantages, the present invention basically contemplates the provision of interference extents on the shank and ring members located in such longitudinally opposed relation as to be brought into yieldably interfering engagement during completion of forward advancement of the ring member into the recess, for yieldably resisting such advancement sufficiently to develop increasing resistance to relative rotation of the shank and ring members as the interference extents are forceably engaged More specifically, the interference extent on the shank member includes a series of circularly spaced ribs projecting outwardly and tapering rearwardly to penetrate into and enlarge the ring member interference extent as the ring member is pushed forwardly over the shank member, thereby creating several advantageous conditions.

First of all, the expansion of the softer material of the ring member in response to yieldable engagement with the interference extent or ribs on the shank member creates hoop tension forces in the ring acting to hold the ring in tightly gripping relation on the shank so as to prevent relative rotation of these members Consequently, the ribs on the shank member penetrate or broach to some extent the ring member softer material as the latter is expanded over the ribs, thereby positively interlocking these members. The latter condition is enhanced by interference engagement of the expanding ring member with the recess bore in the base member, tending to prevent further expansion of the ring member away from the ring axis as the ring is advanced axially forwardly. Thirdly, such outward expansion of the ring member interference extent causes the latter to be brought into underlying or forwardly spaced relation to the external serrations on the ring members which cut into the base member, so that the ring maximum diameter taken across the crests of the external serrations may be lesser in relation to the diameter of the shank member at the ribs or forward threads than if no expansion of the ring member took place.

These and other objects and advantages of the invention, as well as the details of illustrative embodiments, will be more fully understood from the following detailed description of the drawings, in which FIG. 1 is an enlarged vertical section taken through the fastener just prior to forward advancement of the ring member into interlocking engagement with the base member;

FIG. 2 is a view like FIG. 1 excepting that the ring member is shown completely advanced into the recess and over the shank member;

FIG. 3 is a fragmentary section taken on line 3—3 of FIG. 2;

FIG. 4 is a view like FIG. 2 showing another form of the invention;

FIG. 5 is a fragmentary section taken on line 5—5 of FIG. 2; and,

FIG. 6 is a fragmentary section showing another modified form of the invention.

Referring first to FIG. 1, the base member to which the fastener is to be connected is shown generally at 10. The base is forwardly and inwardly recessed from surface 11, the recess being interiorly defined by an internal thread 12 terminating rearwardly at shoulder 13, and by a counterbore 14 extending between the shoulder 13 and the mouth of the recess at the base surface 11.

Projecting into the recess is a longitudinally forwardly extending shank member generally shown at 15, the shank having an external thread 16 interfitting the recess thread 12 for anchoring the shank therein. The shank includes an integral stud 17 projecting rearwardly from the base member 10, and there is typically an external thread 18 formed on the rearward portion of the stud for connecting the stud to other equipment, as by a nut interfitting the thread 18. The stud extent of the shank may be omitted as shown in FIG. 4 so that the anchored shank is substantially flush with the base member surface 11. Also, the shank may be tubular and contain a bore 119 as is also seen in FIG. 4.

Integral with the shank to the extent of having a frictional fit thereon is a ring member generally designated at 19, the ring and shank having a common axis 20. The ring member carries means to interfit the base member for holding the ring member against rotation relative to the base after the ring member is advanced relatively forwardly along the base and into the recess, as illustrated in FIG 2. Such means may typically comprise outwardly tapering and circularly spaced serrations 21 carried by the ring annulus in such longitudinally overlapping relation to the base material outwardly of the counterbore 14 as to result in broaching or penetrating of the serrations into that base material as the ring is advanced forwardly into the recess.

Such forward advancement of the ring is guided by sliding contact of the ring bore 22 with the shank member, and particularly at the contacting faces of the interference extents 23 and 24 on the ring and shank members. These latter extents are located in such longitudinally opposed relation as to be brought into yieldably interfering engagement during completion of forward advancement of the ring member, for yieldably resisting ring advancement sufficiently to develop increasing resistance to relative rotation of the shank and ring members as the interference extents 23 and 24 are forcibly interengaged.

A typical construction of these interference extents is shown in FIG. 4 to include a series of circularly spaced ribs 25 projecting outwardly and tapering rearwardly, the ribs being integral with the shank member, and particularly with a rearwardly tapering annular boss 26 on the shank member. The boss 26 has a diameter at horizontal plane 27 which is the same as the internal diameter of the ring member, whereby continued forward advancement of the ring member, and particularly the interference extent 23 thereof forwardly of the plane 27 results in outward expansion of the ring member interference extent 23. The flange or boss 26 may alternately be described as flaring forwardly to the horizontal plane 28 toward which the lower terminal 29 of the ring member is moved during the described forward advancement of the ring. Forward advancement of the ring is typically but not necessarily interrupted in predetermined relation to the recess counterbore 14 by engagement of the ring termination 29 with the shoulder 13, thereby accurately locating the ring within the recess.

Referring back to the ribs 25, they have outer terminations 30 which taper rearwardly, and circularly spaced opposite faces 31 that also taper rearwardly so as increasingly to penetrate the broachable material of the ring member and particularly the interference extent 23 thereof which comprises a smooth bore forward portion of the ring, thereby to develop the yielding resistance to advancement of the ring member and the desired positive interlocking of the ring and shank members to prevent relative rotation thereof. Such interlocking is enhanced by expansion of the ring member toward and into engagement with the counterbore 14 during ring advancement, the counterbore containing the ring against further expansion and thereby necessitating increasing penetration of the ring extent 23 by the tapered ribs 25. The latter may be formed on the shank flange 26 as by knurling the latter.

Certain advantages flowing from the invention include the fact that the ring member 19 can be indexed to an infinite number of rotary positions about the axis 20, in each of which the ring member may be forwardly advanced into the recess to interlock the base member and also the shank at the interference extents 23 and 24. Another advantage is in the mounting of the ring member in the position shown in FIG. 1, integrally on the shank, as by the frictional contact between the flange 26 and the ring interference extent 23, and particularly at the location of the horizontal plane 27. Thus, the user need not be concerned with placing a ring member over a shank when the fastener is to be attached to a base member and one operation is thereby eliminated, which saves considerable time. Another advantage inheres in the elimination of need for "matching" serrations on the ring and stud members as disclosed in the Rosan patent. In this connection, it will be understood that the base area 32 penetrated by the serrations 21 on the ring member may be pre-broached without deleteriously loosening the ring, since the interlock between the ring and shank members is compressive and positive. Also, as is clear from the drawings, in both retracted and advanced positions the ring interference extent 23 is generally annular and substantially completely within a longitudinal cylinder defined by the outer diameter of the shank member thread 12.

Typic stud materials will include heat treatable steel, whereas typical ring member materials will include stainless steel and free machining steel. Typical base materials will include aluminum, magnesium, alloys thereof, and stainless steel.

Referring now to FIG. 4, the ring member is shown therein in fully advanced position with serrations or ribs 33 corresponding to those shown at 21 in FIGS. 1 and 2, but differing in that these serrations or ribs are forwardly tapered and extend longitudinally between forward and rearward ends 34 and 35 respectively of the ring member, the latter being generally designated at 36. Also, the shank member comprises a tubular insert and it is entirely received within the recess formed in the base member 10.

In FIG. 6, the ring member 40 is like ring 19 of FIG. 1, excepting that it has an interior flange 41 above which the ring is stepped at 42. The annular flange 41 is adapted to be broached by the serration or ribs 43 on the stud or shank member 44, ribs 43 being like the ribs 25 in FIG. 1, excepting that the shank has a step 45 above the ribs. When the ring 40 is driven downwardly into the recess 46, the ribs 43 broach themselves into the ring flange 41, and certain of the material broached from the flange may be received into the cut-away portion 48 of the ring above the step 42. As seen in FIG. 6, the axial dimension of the ribs 43 is sufficient to penetrate axially through the flange 41 when the ring is driven into the recess, and also the root depth of the ribs 43 is sufficient to accommodate the broaching of the flange.

I claim:

In a fastener attachable to a base and which includes a longitudinally forwardly extending shank member, the forward end of said shank being formed with external threads for threaded engagement with the wall of a recess formed in the base, said shank including a frusto conical boss having its base presented forwardly, and a ring member received on the shank member in retracted position relative to said thread, the ring having a series of radially outwardly presented circularly spaced axially extending serrations connectible into the base during relative forward advancement of the ring member along the shank to advanced position in said recess to secure the ring against rotation relative to the base, the outer edges of said serrations being tapered toward said forward end, the improvement that comprises said ring having a generally smooth bore, and ribbing on said shank boss flaring outwardly generally forwardly of the ring to be broached into said bore and to drive said ring forward portion into radially outwardly expanded configuration into engagement with the recess wall during completion of said forward advancement of the ring member thereby developing resistance to relative rotation of the shank and ring members, said ribbing being generally forward and inward of said serrations and comprising a plurality of circularly spaced generally axially extending ribs, each of said ribs having a pair of side surfaces and an outer surface, said side surfaces extending generally perpendicular to said boss and converging in directions away from said forward end until they meet, said outer surface being inclined toward said boss in a direction away from said forward end.

References Cited in the file of this patent

UNITED STATES PATENTS

| 1,499,072 | Pleister | June 24, 1924 |
| 2,120,577 | Schulte | June 14, 1938 |
| 2,400,318 | Rosan | May 14, 1946 |
| 2,642,242 | Karitzky | June 16, 1953 |
| 2,742,074 | Rosan | Apr. 17, 1956 |
| 2,886,090 | Rosan | May 12, 1959 |